G. E. ALLIN.
TIME CHECKING APPARATUS FOR WORKMEN AND OTHER EMPLOYEES.
APPLICATION FILED MAY 1, 1918.
1,315,588.
Patented Sept. 9, 1919.
2 SHEETS—SHEET 1.
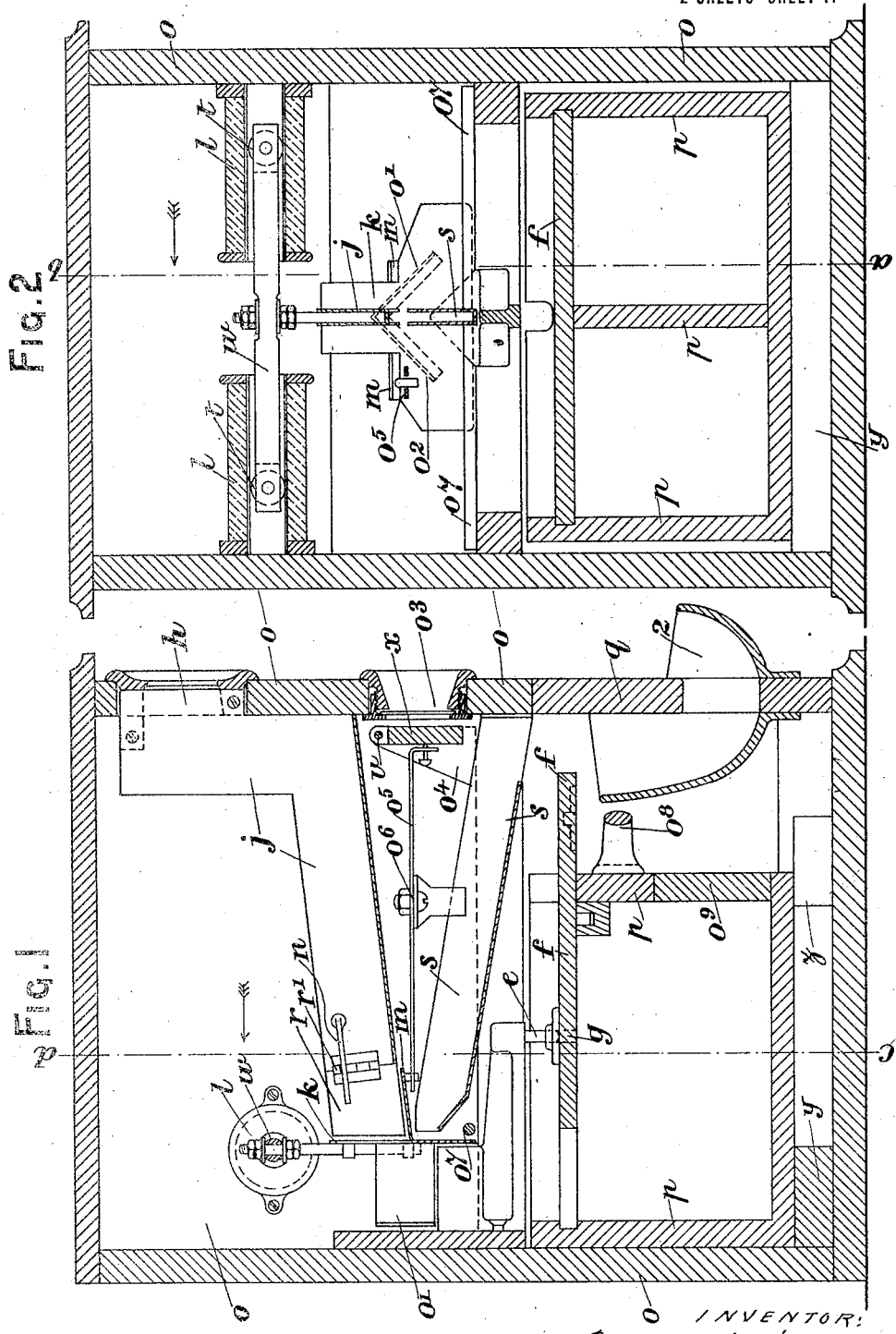

G. E. ALLIN.
TIME CHECKING APPARATUS FOR WORKMEN AND OTHER EMPLOYEES.
APPLICATION FILED MAY 1, 1918.
1,315,588.
Patented Sept. 9, 1919.
2 SHEETS—SHEET 2.
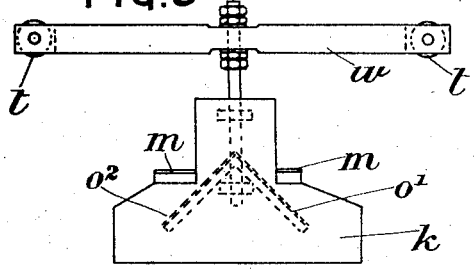
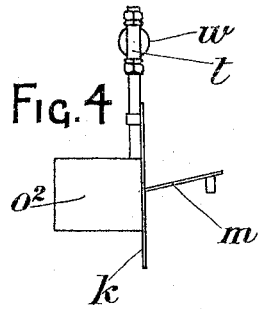
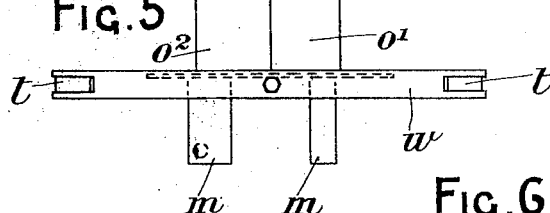
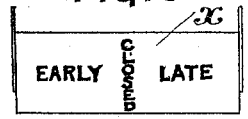
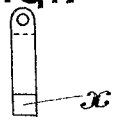
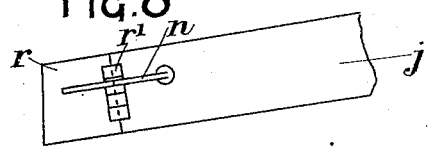
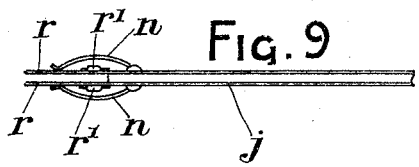
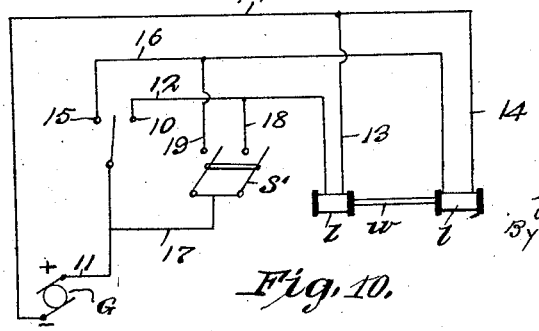
INVENTOR:
George Edward Allin
By Wm Wallace White
ATTY.

UNITED STATES PATENT OFFICE.

GEORGE EDWARD ALLIN, OF DERBY, ENGLAND.

TIME-CHECKING APPARATUS FOR WORKMEN AND OTHER EMPLOYEES.

1,315,588.      Specification of Letters Patent.      Patented Sept. 9, 1919.

Application filed May 1, 1918. Serial No. 231,803.

*To all whom it may concern:*

Be it known that I, GEORGE EDWARD ALLIN, a subject of the King of Great Britain and Ireland, residing at 21 Dairy House road, Derby, in the county of Derby, England, have invented new and useful Improvements in Time-Checking Apparatus for Workmen and other Employees, of which the following is a specification.

The object of this invention is to provide a time checking apparatus so constructed and arranged that a number of same, each complete in itself, may be placed in various departments of a works, the whole being controlled from one central point or office.

Referring to the drawings which form a part of this specification, Figure 1 is a vertical section on line $a$—$b$ of Fig. 2, through an apparatus constructed according to my invention.

Fig. 2 is a vertical section on line $c$—$d$ of Fig. 1.

Fig. 3 is a front elevation of the moving carriage.

Fig. 4 is a side elevation of the moving carriage.

Fig. 5 is a plan of the moving carriage.

Fig. 6 is a front elevation of the indicator.

Fig. 7 is a side elevation of the indicator.

Fig. 8 is a side view of the inclined part of the fixed chute from slot showing the arrangement of hinged door.

Fig. 9 is a plan of same.

Fig. 10 is a diagrammatic view showing one form of controlling means for the solenoids and embodying my invention.

In carrying out my invention I employ a cabinet or the like $o$ in the lower portion of which is placed a removable box or receptacle $p$, hereinafter called the transit box; this portion of the cabinet is provided with any suitable locking door $q$ to admit of the removal of said transit box; the latter has one or more compartments and is used for receiving the workmen's checks while in the cabinet and as a means of transit for the checks between the cabinet and the central time office; it may be provided with a handle as shown at $o^8$ or any other suitable means for so carrying it or placing it in its proper position in the cabinet. Means are provided whereby this box $p$, which has a sliding self locking lid $f$, is closed and locked by the action of withdrawal from the cabinet; to effect this said lid has a hole $g$ in the top which engages with a spigot $e$ fixed inside the cabinet in such a manner that when the box is inserted in said compartment and lifted up until the hole $g$ is in engagement with the spigot $e$ the act of pushing the box farther into the cabinet and into its proper position on the fixed ledge $y$ and movable ledges $z$, causes the lid to slide open to the position shown in Fig. 1, the spring lock being momentarily released to enable this to be done; the box has to be lifted up to the predetermined height of the fixed ledge $y$ before it can be placed home in the cabinet. The act of withdrawing the box from the fixed ledge $y$ closes and locks the lid and until said box has been withdrawn to such a position that the lid automatically locks it cannot be lowered from the ledge $y$ and entirely withdrawn from the cabinet. The movable ledges $z$ are to take the weight of the front portion of the transit box when in the final position in the cabinet.

The transit box is also provided with doors $o^0$ for the purpose of removing the checks.

This invention is applicable for one, two or three separate times, but will be hereinafter further described as for two separate times and the return to the workman of his check when placed in the cabinet after allowable checking time; for this purpose the transit box is divided into two compartments as shown on Fig. 2 which when it is in position are open to chutes $o^1$, $o^2$ leading from the moving carriage to be hereinafter described.

The front of the upper portion of the cabinet is provided with a vertical slot $h$ into which the workman places his check, a fixed chute $j$, which retains said check in its vertical position, carries it forward to the face of a moving carriage $k$ actuated horizontally by means of solenoids $l$, $l$; the above chute has no bottom for part of its length but false bottoms $m$ are provided on the moving carriage which in predetermined positions allow the check to pass through its face on to side chutes, $o^1$, $o^2$, fixed thereto immediately over the compartments of the transit box.

To prevent a possible inoperation of the mechanism should the check be passing through at the moment the carriage is commencing to travel, a portion $r$ of each vertical side of the chute from the slot is hinged at $r^1$ in such a manner that said chute side opens out, the check being released either into the original side chute for which it was intended or returned to the workman; said hinged chute sides may be kept in their normal positions by means of light springs shown upon Fig. 1 at $n$.

When the carriage is in such a position that one of the false bottoms $m$ is no longer in relative position with the vertical chute $j$ the check hits the face of the moving carriage $k$ between said false bottoms, drops through the bottom of the chute $j$, travels down chute $s$ and is returned to the workman through a hand hole 2 in the front door of the cabinet.

The moving carriage is carried by an iron bar or bars $w$ provided with ball or other bearings or rollers $t$, fixed in the iron bar or bars to take its weight and runs on the internal tubes of the solenoids. An indicating plate $x$ is also provided carrying fixed time figures or letters, or combinations thereof, showing through a panel or the like $o^3$ in the face of the cabinet the time for which the workman is at the moment checking, thus for the particular form of apparatus being now described the indicator shows two times, one at each end, and a blank corresponding with the central position. This indicating plate $x$ is carried on a light wire or the like $v$ supported by brackets $o^4$ or otherwise, and is moved laterally at the same time as the moving carriage $k$ by any suitable means such as by connecting it thereto with a light lever $o^5$ pivoted at $o^6$.

In operation one of the solenoids is placed in a suitable electric circuit which has the effect of drawing the traveling carriage $k$ by means of the iron rod or rods $w$ to the full extent of its travel in that direction, in this position one of the false bottoms $m$ is linable with the fixed chute $j$ and checks placed through the face of the cabinet pass to the proper compartment of the transit box $p$. At the predetermined time the second solenoid is placed in circuit in the same manner as above and the carriage travels to its full extent in the opposite direction, checks being then diverted into the second compartment of the transit box. At the expiration of the proper time both solenoids are placed in circuit together and being wound so as to be equal in effective electrical pull the carriage assumes an approximately central position and checks placed through the slot in the front of the cabinet come back to the workman through the beforementioned hand hole 2. The guide rod $o^7$ is provided to prevent the moving carriage $k$ from turning sidewise out of its proper position.

Referring now to Fig. 10, I have here shown one desirable form of controlling means for the solenoids $l$ which comprises a single pole switch S for controlling the supply of current from the generator G to either of the solenoids $l$, $l$. S' designates a double pole switch for controlling the supply of current to both of the solenoids $l$, $l$ so that they will be energized simultaneously. When it is desired to energize the solenoid at the left, the switch S is moved to engage the contact 10 so that current is supplied to the solenoid through the following circuit: from the positive side of generator G through wire 11, switch S, contact 10, wire 12, winding of solenoid, wire 13 and wire 14 back to the generator. When energizing the other solenoid, the switch S is moved to engage contact 15 so that the current is supplied to this solenoid through the following circuit: from the positive side of generator G, through wire 11, switch S, contact 15, wire 16, winding of solenoid, wire 14, back to generator.

When energizing both of the solenoids simultaneously, the switch S' is closed so that the hereinbefore described circuits for the solenoids are completed through wires 17, 18, and 19, and the switch S', as will be understood.

From the foregoing, it will be manifest that the controlling apparatus is extremely simple and that either or both of the solenoids may be energized at will.

Having now described my invention, what I claim as new and desire to secure by Letters Patent is:—

1. A device of the class described, comprising a main chute, a pair of branch chutes, a movable carriage for directing a check from the main chute into either of the branch chutes, and means for moving said carriage.

2. A device of the class described, comprising a main chute, a pair of branch chutes, a movable carriage capable of occupying two extreme positions for directing a check from the main chute to either of the branch chutes, according as it occupies one extreme position or the other.

3. A device as embodied in claim 2, and electromagnetic means for actuating said carriage.

4. A device of the class described, comprising a main chute, a pair of branch chutes, a carriage movable transversely of the main chute for directing the check from the main chute into either of the branch chutes, and electro-magnetic means for moving said carriage.

5. A device of the class described, comprising a main chute, a pair of branch chutes, a return chute, and a movable carriage capable of occupying two extreme positions for directing a check into either of the branch chutes and an intermediate position for directing a check into the return chute.

6. A device as embodied in claim 5, and electromagnetic means for moving said carriage to the position hereinbefore mentioned.

7. A device as embodied in claim 5, and a pair of solenoids for moving said carriage to the positions hereinbefore mentioned.

8. A device as embodied in claim 7, said solenoids being arranged in opposed relation and having a common core.

9. A device of the class described, comprising a main chute, having a fixed section and a hinged section biased to a predetermined position, a pair of branch chutes, a carriage movable transversely of the main chute, rollers for supporting said carriage, a track for said rollers, and a pair of solenoids for actuating said carriage.

10. A device of the class described, comprising a main chute, a pair of branch chutes, a return chute, a movable carriage, and bottoms movable with said carriage for controlling the passage of a check from the main chute to any of the other chutes.

11. A device of the class described, comprising a main chute, a pair of branch chutes, a return chute, a carriage movable transversely of the main chute, and false bottoms movable with the carriage and adapted to register with one end of the main chute at predetermined points within the movement of the carriage for the purpose described.

12. A device of the class described, comprising a main chute, a pair of branch chutes, a return chute, a movable carriage capable of occupying two extreme positions and an intermediate position for the purpose described, and indicating means actuated by said carriage.

13. A device of the class described, comprising a cabinet, a pair of branch chutes, a transit box within the cabinet, a sliding self-locking lid on the box, and means carried by the cabinet for opening and closing said lid according as the box is inserted and withdrawn from the cabinet.

14. A device of the class described, comprising a main chute, a pair of branch chutes, a return chute, a movable carriage for controlling the passage of a check from the main chute into the other chutes, electromagnetic means for actuating said carriage, and a distant control for same means.

In testimony whereof I have signed my name to this specification.

GEORGE EDWARD ALLIN.

Copies of this patent may be obtained for five cents each, by addressing the "Commissioner of Patents, Washington, D. C."